Oct. 25, 1966  J. A. SOULES  3,281,713
LASER Q SHARPENER
Filed March 27, 1963
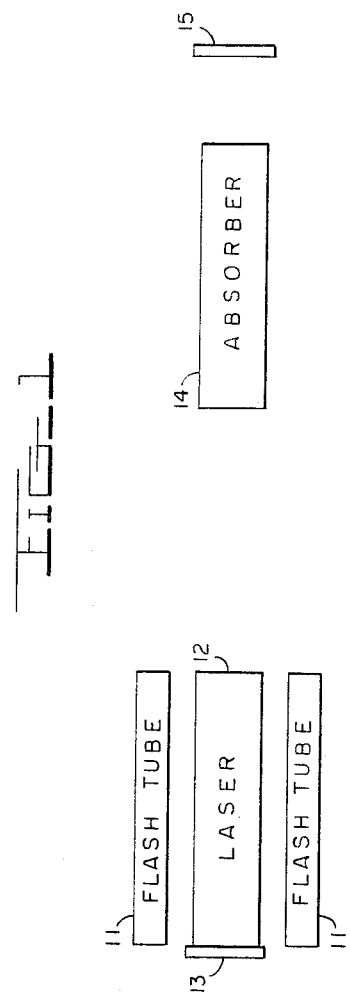
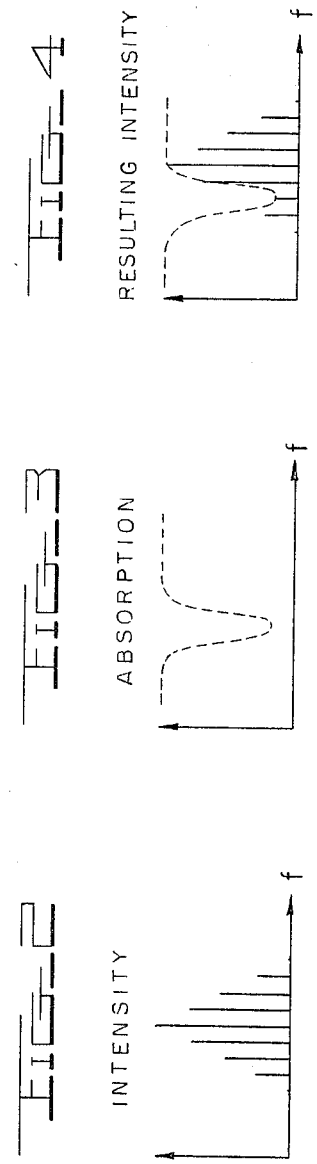
INVENTOR.
JACK A. SOULES
ATTORNEY

3,281,713
LASER Q SHARPENER
Jack A. Soules, 870 N. Arlington Mill Drive, Arlington, Va.
Filed Mar. 27, 1963, Ser. No. 268,506
3 Claims. (Cl. 331—94.5)

The invention described hereby may be manufactured and used by or for the Government of the United States of American for governmental purposes without the payment of any royalties thereon or therefor.

The present invention is directed to a laser system and more particularly to a system for limiting the "Q" of a laser.

Heretofore various conventional optical and geometrical mode selection systems have been used in laser systems to limit the propagation of "off-axis" modes. These systems result in a laser output which comprises a series of frequencies of minimum intensity on through maximum intensity and back to a minimum intensity at higher frequencies. Also, the line widths are sufficiently wide to include several axial modes at room temperature.

It is therefore an object of the present invention to limit the "Q" of a laser.

Another object of the present invention is to produce a more nearly monochromatic output.

Still another object is to provide a convenient frequency control of a laser.

Other and more specific objects of this invention will become apparent upon a more careful consideration of the following detailed description when viewed together with the accompanying drawing, in which:

FIG. 1 illustrates a laser system making use of the present invention;

FIG. 2 illustrates a series of output frequencies of a laser used in the prior art systems;

FIG. 3 illustrates an absorption curve of an element of laser material and shows the change in absorption when under tension or compression or when held at a low temperature, and FIG. 4 illustrates the resultant output of a laser system in accordance to the present invention.

The present invention is directed to a system which includes a laser in combination with an absorber laser material under compression or tension, one that is held at a low temperature or in a magnetic field. The absorber, when under one of the above-mentioned conditions, sharpens and shifts the resonance absorption line so as to absorb only a wing portion of the main spectrum. It is also possible with a combination of tension and compression to absorb both the upper and lower side bands of the main spectrum.

Now, referring to the drawings, there is shown by illustration a system for carrying out the teaching of this invention. As shown, the system includes a normally operated laser including a light source 11, an element of laser material 12, such as ruby, which has a fully reflecting mirror 13 on one end and an end which has no mirror. An absorber 14 made of a laser material, which may be the same as element 12, is positioned opposite the non-mirrored end of the element of laser material in axial alignment therewith. A partially reflective mirror 15 is positioned opposite the end of absorber 14 which is remote from the element 12 and is properly aligned with mirror 13, as is well known in the laser art when used at the ends of a single well known element of laser material.

FIG. 2 illustrates a series of frequencies of a normal laser output produced by a system such as shown in FIG. 1 excluding the absorber element and with the mirrors on each end of the element of laser material.

FIG. 3 represents an absorption curve of an element of laser material and shows the change in absorption when under tension or compression or held at a low temperature. A low temperature applied to the laser shifts the output frequencies toward the violet and makes the laser material operative over a different frequency range.

FIG. 4 illustrates the resulting intensity of the laser output of a system which includes an absorber material similar to that shown in FIG. 1.

As shown, an optically active material (the laser material itself) is placed in the optical cavity but outside of the exciting lamp region of the main laser material. The laser material outside of the lamp region is held at a low temperature (liquid oxygen) and the resulting resonant absorption will strongly increase the "Q" of the laser. The light source is applied onto the laser material 12 which causes the element to lase. The light produced in the element 12 will be reflected back and forth through the element 12 and absorber 14 by the fully reflecting mirrored surface 13 and the partially reflective mirror surface 15. Since the absorber is held at a low temperature, the resonance absorption line in the absorber is shifted toward the violet. This then absorbs some of the wing frequencies on one side of the normal output of the main laser element which will produce a narrower band width of frequencies in the output through the partially reflective mirror.

Another manner in which the resonance absorption line may be shifted and sharpened is by placing the active ion in dissimilar media and then placing the dissimilar media in the optical cavity outside of the exciting lamp region. In this manner the absorption line can be shifted to absorb the upper sideband by one media and the lower sideband in the other media.

Still another manner is to place two absorbers of the same laser material into the optical cavity outside of the exciting lamp region and then compressing one absorber while applying tension on the other absorber. The compression and tension rearranges the atoms in such a manner that one absorber will absorb the upper sideband while the other absorber absorbs the lower sidebands.

Yet another method is to apply a magnetic field to the absorber wherein the magnetic field shifts the resonance absorption line. The sideband absorbed will depend on the direction in which the magnetic field is applied.

The present invention provides different methods of increasing the "Q" of a laser by absorbing the fringe frequencies of the output from a laser element thereby increasing the "Q."

Obviously many modifications and variations of the present invention are possible in the light of the above teachings. It is therefore to be understood that within the scope of the appended claims the invention may be practiced otherwise than as specifically described.

What is claimed is:
1. A system for limiting the "Q" of a laser element which comprises:
   a laser element having one fully reflecting end member and a mirrorless end,
   means arranged about said laser element for pumping said element,
   a radiation absorber means in axial alignment with said laser element having a partially reflecting mirror on the end thereof remote from said laser element with a mirrorless end opposite the mirrorless end of said laser element, means for rearranging the inner structure of said radiation absorber to change the absorption characteristics thereof whereby the absorption characteristics of said absorber shifts to absorb some radiation passing therethrough from said laser element, and wherein the absorption characteristics of said absorber are changed by placing said absorber under tension.

2. A system as claimed in claim 1 wherein the absorption characteristics of said absorber are changed by placing said absorber under compression.

3. A system as claimed in claim 1 wherein said absorption characteristics are changed by using compression on one absorber element and tension on another absorber element placed within said system in axial alignment with said laser element.

References Cited by the Examiner

UNITED STATES PATENTS

| 3,213,281 | 10/1965 | Nedderman | 331—94.5 |
| 3,229,222 | 1/1966 | Sorokin et al. | 331—94.5 |

OTHER REFERENCES

Chen, "An Absorption-Type Laser Modulator" from Lasers and Applications; W. S. C. Chang, Ed., a symposium held Nov. 7–8, 1962, in Columbus, Ohio, pp. 202–207.

Wieder, "Optical Detection of Paramagnetic Resonance Saturation in Ruby," Physical Review Letters, vol. 3, No. 10, Nov. 15, 1959, pp. 468–470.

JEWELL H. PEDERSEN, *Primary Examiner.*

RONALD L. WIBERT, *Examiner.*